United States Patent [19]

Naudin et al.

[11] Patent Number: 4,972,933
[45] Date of Patent: Nov. 27, 1990

[54] ANNULAR DIAPHRAGM SPRING FOR USE IN AN AUTOMOBILE CLUTCH

[75] Inventors: Jacky Naudin, Ermont; Christian Gay, Paris, both of France

[73] Assignee: Valeo, Paris, France

[21] Appl. No.: 275,423

[22] Filed: Nov. 23, 1988

[30] Foreign Application Priority Data

Nov. 25, 1987 [FR] France ............................... 87 16330

[51] Int. Cl.⁵ ............................................. F16D 13/44
[52] U.S. Cl. .............................. 192/89 B; 192/70.27; 267/161
[58] Field of Search ........................... 192/89 B, 70.27; 267/161

[56] References Cited

U.S. PATENT DOCUMENTS

| 4,362,230 | 12/1982 | Corral | 192/109 R |
| 4,465,267 | 8/1984 | Chatelin | 267/161 |

FOREIGN PATENT DOCUMENTS

| 1475437 | 8/1970 | Fed. Rep. of Germany . | |
| 3241248 | 5/1984 | Fed. Rep. of Germany | 192/89 B |
| 3307943 | 9/1984 | Fed. Rep. of Germany | 192/89 B |
| 1440391 | 4/1966 | France . | |
| 2311221 | 4/1978 | France . | |
| 2459921 | 1/1981 | France . | |
| 2580752 | 10/1986 | France . | |
| 63-62634 | 4/1988 | Japan . | |
| 2094420 | 9/1982 | United Kingdom | 192/89 B |
| 2140106 | 11/1984 | United Kingdom . | |
| 2155566 | 9/1985 | United Kingdom . | |
| 2187519 | 9/1987 | United Kingdom | 192/89 B |

*Primary Examiner*—Richard Lorence
*Assistant Examiner*—Nicholas Whitelaw
*Attorney, Agent, or Firm*—Charles E. Brown; Charles A. Brown

[57] ABSTRACT

The present invention relates to annular diaphragm springs for use in clutches and speed changers for automobile vehicles, of the kind having radial fingers separated by orifices alternating with the fingers. According to the invention at least two fingers are each equipped with a fold delimiting a lateral part of the orifice. This stiffens the fingers without increasing the thickness of the diaphragm.

2 Claims, 3 Drawing Sheets

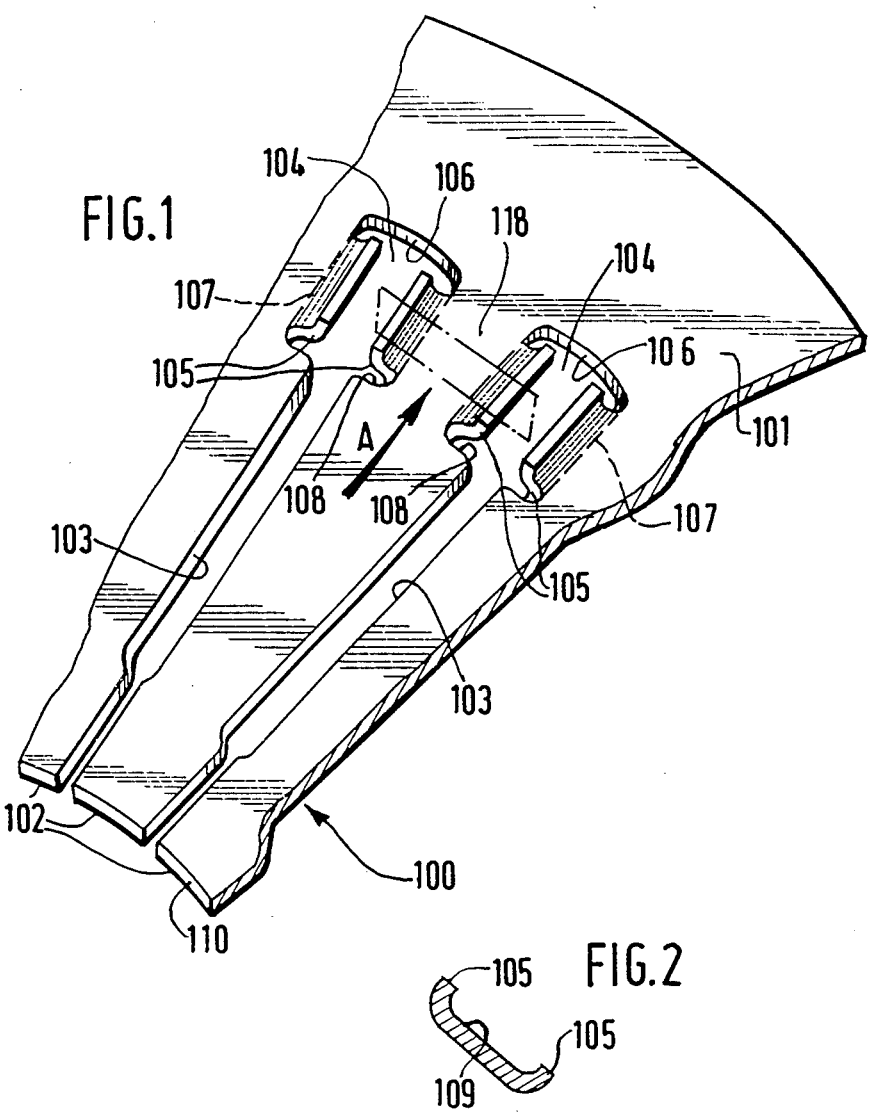

ANNULAR DIAPHRAGM SPRING FOR USE IN AN AUTOMOBILE CLUTCH

FIELD OF THE INVENTION

The present invention relates to annular diaphragm springs of the kind commonly used in clutches or speed changers, especially for automobile vehicles.

A diaphragm spring of this kind usually comprises a circularly continuous peripheral part, forming a Belleville washer, and a central part divided into radial fingers by slots, certain of which, at least, open into a central aperture.

At rest the diaphragm has a truncated cone shape and the slots open at their external periphery into orifices with lateral edges provided at the origin of the radial fingers, and alternating with the latter.

BACKGROUND OF THE INVENTION

Such a diaphragm may equip a clutch, as described in French patent No. FR-A-2463874. In this document the clutch comprises a reaction plate fixed to the crankshaft of the engine and a cover fixed to the reaction plate. The diaphragm bears on the cover and on a pressure plate, connected in rotation to the cover but movable axially relative to the latter, for axial displacement of the pressure plate towards the reaction plate and to clamp between them a friction disc integrally in rotation with the input shaft of the gear box.

The diaphragm is moved by a clutch release bearing acting on the free ends of its fingers. The diaphragm may likewise equip a speed changer comprising, as described in the U.K. Patent No. GB-A-2140106, two pulleys, driving and driven respectively. Each of these comprises a hub and two annular flanges around the hub facing one another, one of which is fixed relative to the hub and the other being movable relative to the hub under the control of at least one diaphragm.

In the above document, in the case of each pulley, the diaphragm is covered by an elastic material and bears by means of its Belleville washer portion on the movable flange and by means of its central part on a bearing part fixed to the hub. The diaphragm drives the movable flange towards the other flange to clamp a belt. Operation of the speed changer is effected by varying the pressure in sealed chambers each delimited by the diaphragm, the movable flange and the bearing part.

In every case, during the operation of the clutch or of the speed changer, a flexing of the fingers of the diaphragm is produced which is greater than that of its Belleville washer portion, and there is therefore some dead travel.

To reduce this dead travel it has already been proposed in the German Patent Nos. DE-A-3307943 and DE-A-147543,7 to stiffen the fingers of the diaphragm by equipping their principal part with at least one fold made by making slits with defined shapes. Such arrangements are not entirely satisfactory since they complicate the fabrication of the fingers of the diaphragm and require special tooling.

To diminish the dead travel it is likewise possible to increase the thickness of the fingers. This arrangement is likewise unsatisfactory since, in addition to an onerous machining, it alters the Belleville washer portion of the diaphragm as a result of the discontinuity in thickness.

The object of the invention is to overcome these disadvantages while retaining the internal part of the fingers and the Belleville washer portion of the diaphragm, while obtaining other advantages and making use of the orifices in the diaphragm.

SUMMARY OF THE INVENTION

According to the invention, a diaphragm of the kind described above is characterized in that at least two fingers of the diaphragm are each equipped with a fold delimiting in part the lateral edge of an orifice. As a result of this fold the thickness of the diaphragm may be retained as well as the shape of the Belleville washer and the geometry of the slots, with minimal alterations in tooling.

It will be appreciated that the material in the fold may be taken at least in part from that of the orifice; that the invention makes use of discarded material; and that the geometry of the diaphragm is retained. Good stiffening of the fingers is obtained since the folds are disposed near the origin of the fingers, in contrast to those of the prior art, which reduces the flexing of the fingers. In addition they have a greater height than those cut from the slots. This arrangement combines well with orifices of generally rectangular shape having lateral edges extending substantially radially.

The folds are advantageously made by folding at right angles with a certain radius of curvature so that the folds extend axially. This configuration is particularly advantageous in the case where two diaphragms are employed since it enables, through the penetration of the folds of one of the diaphragms into the orifices of the other, the locking in rotation of the diaphragms and a better torque transmission.

It will be appreciated that the folds facilitate centering of the diaphragm by lugs or studs. In practice, wear may be decreased as a result of a larger contact zone provided by the folds.

The characteristics and advantages of the invention will become apparent from the description which follows with reference to the attached drawings.

BRIEF DESCRIPTION OF THE DRAWINGS

FIG. 1 is a partial view in perspective of a diaphragm according to the invention, used to equip a clutch;

FIG. 2 is a view of a detail that part of FIG. 1 which is marked by a box, in section in the direction of arrow A;

DESCRIPTION OF THE PREFERRED EMBODIMENTS

Figure 3:
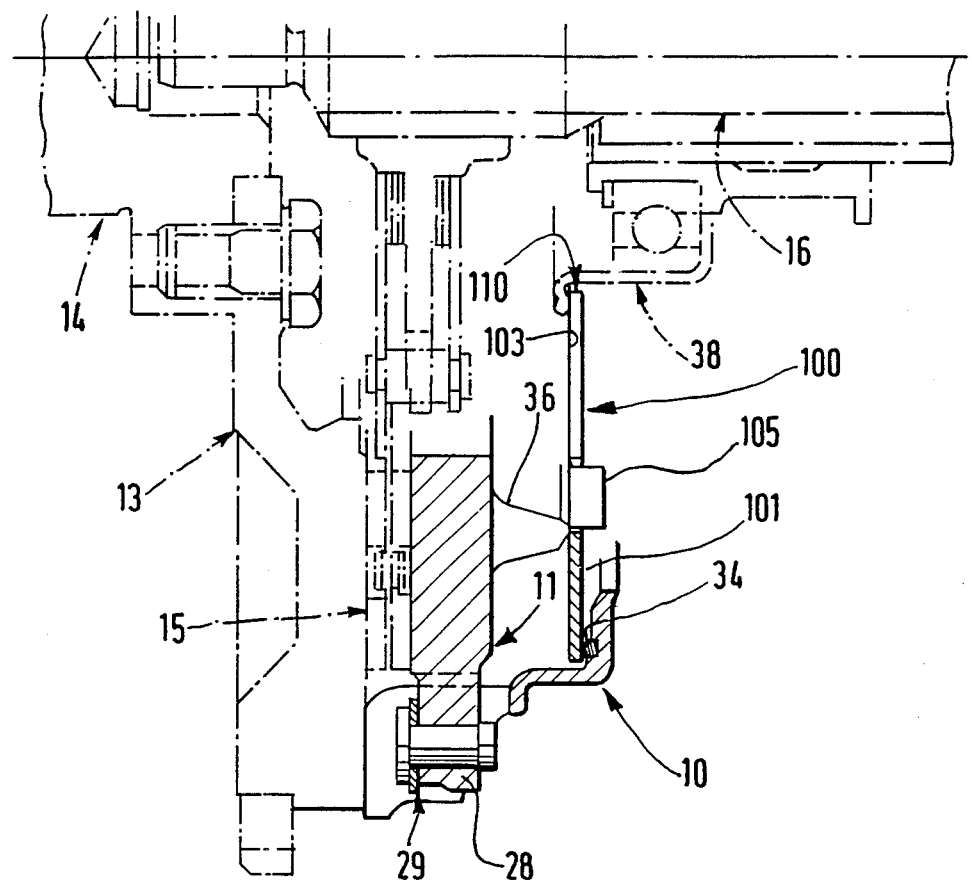
FIG. 3 is a partial half view in axial section of a clutch fitted with a diaphragm according to the invention.

FIG. 3 shows marked by 13 (by a chain dotted line) the reaction plate of the clutch fixed to the crankshaft 14 of the engine of an automobile vehicle. This clutch has the same shape as that described in the document FR-A-2463874 and comprises a cover 10 fastened to the reaction plate 13 by screws which are not shown.

A pressure plate 11 is attached to the cover by tangential tongues 29 each fixed, on the one hand, to a lug 28 of the plate 11 and, on the other hand, to a flat part of the cover 10. Thus the pressure plate is axially movable relative to the cover but connected in rotation to the latter.

A diaphragm 100 bears on a boss 36 of the plate 11 by the internal periphery of its Belleville washer 101 portion, whereas by its external periphery of the portion 101 it bears on a retaining ring 34 of the cover. In the clutch engaged position the diaphragm 100 drives the pressure plate 11 towards the reaction plate 13 to clamp between them a friction disc 15 connected in rotation to the input shaft 16 of the gear box.

To disengage the clutch, a clutch release bearing 38 passes through the central opening 110 of the diaphragm to exert a pulling action on the ends of the fingers 102 of the diaphragm. More specifically, FIG. 1 shows, indicated at 100, the diaphragm according to the invention, having a truncated cone shape at rest, with its peripheral portion forming a Belleville washer 101, and its radial fingers 102 separated by radially orientated slots 103.

The slots 103 open at their external periphery into orifices 104 provided at the origin or root 118 of the fingers 102 in alternation with the latter. These orifices 104 constitute a dead end for each of the slots 103 as well as a symmetrical circumferential widening of the latter.

In accordance with the invention at least two fingers 102 of the diaphragm are each equipped with a fold (or flanged edge) 105 delimiting in part the lateral edge 107 of the orifice 104.

In the present case these orifices 104 have a substantially rectangular contour. Their radially outermost edges 106 are tangential to a common circumference delimiting the internal periphery of the Belleville washer 101. The lateral edges 107 (extending substantially radially) are rectilinear and have been schematically shown here by broken lines.

The radially innermost edge 108 of the orifice 104 is interrupted by the slot 103. In the present case all the lateral edges 107 are delimited by the folds 105 the material for which is taken from the orifices 104. They extend in the direction away from the pressure plate 11. These folds have a length smaller than that of the lateral edges 107 for punching out reasons and to decrease stresses, a clearance being provided radially between each edge 106, 108 and the folds 105.

As can be better seen in FIG. 2, the folds 105 extend axially (perpendicular to the plane of the Figure) and the origin 118 has a profile in the shape of a channel with a flat bottom 109 as a result of the radius of curvature necessary for folding the folds. The folds 105 form an widening of the origin 118 of the fingers 102. At their internal end the slots 103 are narrowed and open into the central opening 110.

Consequently a good bearing surface is offered to the clutch release bearing 38 and there is no fear of interference during the movement of the clutch between the folds and the bearing.

Figure 4:
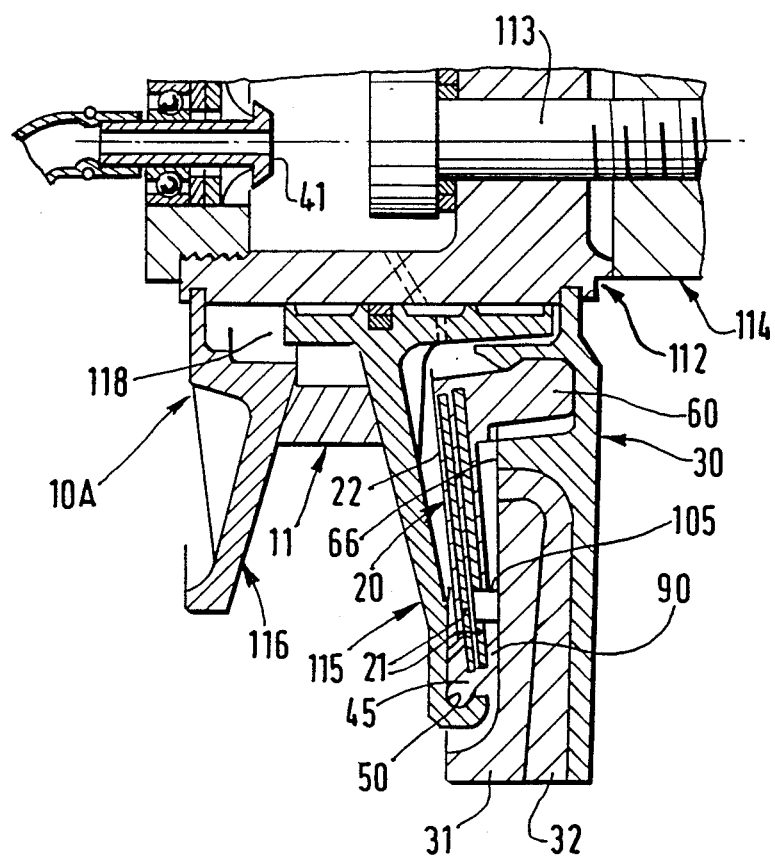
FIG. 4 a partial half view in axial section of a speed changer equipped with a diaphragm according to the invention.

FIG. 4 shows, in the case of a speed changer, that advantage can be taken of the folds 105. It shows the driving pulley 10A of a speed changer with its hub 112 fastened to the end of the drive shaft 114 by a screw 113, the fixed flange 16 of the pulley being fastened by crimping on the hub. The movable flange 115 of the speed changer has a bush 118 which the latter comprises at its inner periphery to slide along the hub under the action of a unitary elastic assembly 20.

This unitary elastic assembly, as described in French Patent No. FR-8710468, is formed by two diaphragms 21 covered by an elastic material 22 projecting radially at the outer periphery of the diaphragms by means of a pad of elastic material 45, offset axially relative to the diaphragms and installed, to cooperate with the flange 115, in a housing 50 delimited by two axial returns forming a groove. At its inner periphery the covering 22 is prolonged by a corrugated spacer made of elastic material 60 engaged, for connection in rotation, in complementary corrugations comprised in an axial crown 66 carried by a flange 30 fixed by crimping to the hub. Thus the unitary elastic assembly bears axially on the hub 30 to drive the movable flange 115 towards the fixed flange 116.

The speed changer is of the hydraulically controlled kind, being fed by a source of pressure by means of a joining piece 41, and by altering the pressure in the chamber delimited by the unitary elastic assembly 20, the flange 115 and the part 30, the flange 115 is moved to displace the belt 11.

In the present case the folds 105 may come into contact with the inertia ring 31, connected by a damping element 32 to the part 30 to limit the maximum separation between the two flanges 115 and 116 on replacing the elastic bearing 90 which the pad 45 comprises. Of course it is possible to keep the portion of the bearing 90 situated radially beyond the folds 105 in such a way that this portion will project axially relative to the fold and will come into contact first with the ring 31.

It will be appreciated that this arrangement is dependable and not very noisy since a reduction in noises and great reliability is obtained, the folds intervening at high engine speeds.

One out of two orifices may advantageously be equipped with a fold 105, the others being intact, which enables the other diaphragm 100, that closer to the flange 115, to be equipped with a fold penetrating into the orifice to provide locking of the diaphragms in rotation.

It will be appreciated that this arrangement likewise favours indexing of the diaphragms during the operation of moulding and of fabricating the unitary elastic assembly by vulcanization in situ.

Alternatively, the diaphragm closer to the ring 31 may be equipped with alternate folds pointing in the opposite direction to fulfill the role of an indexing bearing for the other diaphragm.

Of course the present invention also applies to a clutch of the "pushed" kind and in this case all the orifices are not necessarily equipped with folds so as to leave a passage for the assembling lugs or small columns attaching the diaphragm to the cover in a pivoting manner.

A single lateral edge of the orifice may be equipped with a fold or one and the same orifice may be equipped with folds pointing in opposite directions. The folds may extend obliquely.

A unitary assembly having two diaphragms, locked in rotation relative to one another by folds, as described above in the case of a speed changer, may be employed in a clutch. In this case, the elastic material does not cover the diaphragm in the region of the bearings 36, 34 and of the bearing 38.

The slots 103 do not all necessarily open into the central opening as divulged in French Patent No. FR-A-2311221.

Finally, the orifices 104 may not all be identical, certain may have a lesser radial extent as described in the U.S. Pat. No. 4,465,267. In this case the folds will affect the orifices having a larger size.

What is claimed is:

1. An annular diaphragm spring for use in automotive clutches and speed changers, comprising a circularly continuous peripheral part (101) forming a Belleville washer, and a central part divided into radial fingers (102) by slots (103) at least some of which open into a central opening (110), the slots opening out at their external periphery into orifices (104) provided in the vicinity of radially outer origins or roots (118) of the radial fingers and alternating therewith, said orifices (104) having a greater circumferential width than the slots (103), wherein at least one of said orifices has a substantially rectangular contour with two lateral edges extending substantially radially, and two radial edges (106, 108) extending substantially circumferentially, and wherein at least one of said lateral edges is delimited in part by a fold (105) made from material which is taken from the orifice (104) to form a widening of the root or origin (118) of a finger (102), at least one finger having a channel shaped root or origin (118) with a flat bottom (109) and two of said folds are each delimiting in part the lateral edge of two successive openings of the rectangular contour.

2. The annular diaphragm spring according to claim 1, wherein said fold has a length less than that of said lateral edge delimited by said fold, and wherein a clearance is provided between each of the radial edges (106, 108) of said orifice of the rectangular contour and said fold.

* * * * *